United States Patent [19]
Pouliquen et al.

[11] Patent Number: 5,737,205
[45] Date of Patent: Apr. 7, 1998

[54] SEMICONDUCTOR STATIC ELECTRIC POWER CONVERTER OPTIMIZED FOR OPERATION IN ZERO-VOLTAGE MODE

[75] Inventors: Hervé Pouliquen, Clamart; François Forest, Saint Clement; Khaled Elloumi, Clamart; Wissam Melhem, Cachan Cedex, all of France

[73] Assignee: Electricite De France Service National, Paris, France

[21] Appl. No.: 667,309

[22] Filed: Jun. 21, 1996

[30] Foreign Application Priority Data

Jun. 29, 1995 [FR] France .................................. 95 07840

[51] Int. Cl.$^6$ ..................................... H02M 3/24
[52] U.S. Cl. ..................... 363/96; 363/98; 363/132; 363/135
[58] Field of Search ................... 323/222; 363/39, 363/40, 43, 56-58, 79, 95-98, 123, 124, 131, 132, 134, 135, 137, 138

[56] References Cited

U.S. PATENT DOCUMENTS

| | | |
|---|---|---|
| 4,864,483 | 9/1989 | Divan .................. 363/132 X |
| 5,172,309 | 12/1992 | DeDoncker et al. .................. 363/132 |
| 5,617,308 | 4/1997 | Weise et al. .................. 363/98 |

FOREIGN PATENT DOCUMENTS 42 33 573  5/1993  Germany.

OTHER PUBLICATIONS

Sikorski A. et al., Electronic Power Supply Systems, Brighton, Sep. 13-16, 1993, vol. 3, 13 Sep. 1993 Institution of Electrical Engineers, pp. 174-177.

*Primary Examiner*—Peter S. Wong
*Assistant Examiner*—Y. J. Han
*Attorney, Agent, or Firm*—Larson & Taylor

[57] ABSTRACT

The invention relates to static electric power conversion using semiconductors using soft switching in zero-voltage mode and controlled to perform pulse width modulation, having a first interface (L, C, $T_a$, $D_a$) in series between a DC voltage input (E) and a converter (1), and with a second interface (2) connected to the connection between the first interface and the converter (1) and organized, immediately before the end of a voltage window of amplitude (1+k)E to cause a positive current to flow through the switch ($T_a$, $D_d$) to counter the input current of the converter (1) which is negative when the ripple current flowing through the inductor is at its minimum value so as to reduce the current ripple amplitude required for switching off the switch ($T_a$, $D_a$), thereby reducing the current ripple for controlling interruption of the short circuit provided by the branch(es) of the converter (1).

11 Claims, 10 Drawing Sheets

SEMICONDUCTOR STATIC ELECTRIC POWER CONVERTER OPTIMIZED FOR OPERATION IN ZERO-VOLTAGE MODE

BACKGROUND OF THE INVENTION

1. Field of the Invention

The present invention relates to improvements provided to semiconductor static electric power converters, such as choppers, or single-phase or three-phase voltage inverters, that operate by soft switching in zero-voltage mode and under pulse width modulation (PWM) control, the improvements being for the purpose of optimizing operation.

2. Description of Related Art

It is recalled initially that in order to establish a mode of soft switching in zero-voltage mode using the principle of current reversal together with control by means of pulse width modulation (PWM), a single interface is associated with a conventional converter structure (chopper or voltage inverter), between the DC voltage source and the voltage conversion means having controllable switches. As shown in FIG. 1 of the accompanying drawings which is a basic chopper type circuit with converter means having a single branch with a midpoint M connected to the load, the interface is constituted firstly by an inductor L in series both with said DC voltage source E and with said voltage conversion means having bidirectional controllable switches $(T_1, D_1)$ and $(T_2, D_2)$, and secondly by a connection in parallel with said inductor L and itself comprising a capacitor C in series with an auxiliary bidirectional switch $(T_a, D_a)$. Each controllable bidirectional switch, whether main or auxiliary, is constituted by at least one controllable component (GTO thyristor, bipolar transistor, . . .) switching in "zero-voltage" mode, together with at least one diode connected in antiparallel.

While it is conducting, the auxiliary switch $T_a$, $D_a$ applies to the terminals of the conversion means a voltage window of amplitude $(1+k)E$ (where $kE$ is the voltage across the terminals of the capacitor C) and of duration $\alpha T$ (where T is the operating period of the converter means): graph A in FIG. 2 shows the voltage curve and the curve of the current $i_L$ flowing through the inductor L. This voltage level can be subjected to a second break at a selected moment so as to obtain operation with pulse width modulation of adjustable duration $\alpha' T$ as illustrated by graph B in FIG. 2, which shows the curve of the output voltage $V_s$ across the output terminals of the converter. This second break must be servo-controlled to the sign of the current as seen by the midpoint M (FIG. 1) of the converter branch: if the current is positive $(I_s>0)$, then the width modulated pulse must be set to the left of the voltage window $(1+k)E$, which is the case shown in FIG. 2 where graphs C and D show the currents flowing through the controlled switches $T_1, D_1$ and $T_2, D_2$ respectively, and where the graph E shows the current flowing through the auxiliary $T_a, D_a$. Otherwise, if the current is negative $(I_s<0)$, then the width modulated pulse must be set to the right of the voltage window $(1+k)E$.

The same alphanumeric references are used to designate the same magnitudes or components in FIGS. 1 and 2.

In similar manner, and using the same conventions for references, FIG. 3 is the electrical circuit of a single-phase inverter (two-branch converter means $T_1, D_1$; $T_2, D_2$, and $T_3, D_3$; $T_4, D_4$), whereas in FIG. 4:

graph A shows the voltage window of amplitude $(1+k)E$ and of duration $\alpha T$, and the current $i_L$ flowing through the inductor L;

graph B shows the voltages $V_1$ and $V_2$ at the two midpoints $M_1$ and $M_2$ respectively of the two branches of the converter means;

graph C shows the output voltage $V_s$ across the load terminals, with a positive voltage pulse of adjustable duration $\alpha' T$;

graphs D and E show the currents flowing through the controlled switches of the first branch, $T_1, D_1$ and $T_2, D_2$, respectively; and graph F shows the current flowing through the auxiliary switch $T_a, D_a$ of the additional interface; with the above graphs representing the case where the current seen by the midpoint $M_1$ is positive $(I_s>0)$ and where, consequently, the current seen by the midpoint $M_2$ is negative $(-I_s<0)$.

Still in the same manner and with the same conventions for references, FIG. 5 is the electric circuit of a three-phase inverter [three-branch converter means $(T_1, D_1; T_2, D_2), (T_3, D_3; T_4, D_4), (T_5, D_5; T_6, D_6)$], and in FIG. 6:

graph A shows the voltage window of amplitude $(1+k)E$ and of duration $\alpha T$, and for current in flowing through the inductor L;

graph B shows the voltages $V_1, V_2,$ and $V_3$ of respective durations $\alpha'_1 T, \alpha'_2 T,$ and $\alpha'_3 T$ at the midpoints $M_1, M_2,$ and $M_3$ respectively of the three branches of the converter means;

graphs C, D, and E show the currents flowing through the switches $(T_1, D_1), (T_3, D_3),$ and $(T_5, D_5)$ respectively; and graph F shows the current flowing through the auxiliary switch $T_a, D_a$;

these graphs applying to the case where the currents $I_{s1}$ and $I_{s2}$ are positive and only the current $I_{s3}$ is negative.

For all three converter configurations mentioned, it is easy to adjust the output voltages by freezing $\alpha$ and varying the duty ratio $\alpha'_i$ of conduction through the "top" switch of each branch i (i=1,2,3). Operation then becomes equivalent, at least in terms of mean values, to that of structures which are conventionally controlled by using pulse width modulation.

The resulting current ripple $\Delta i_L$ depends solely on a pair of terms (PWM frequency & inductance L) and is given by:

$$\Delta i_L = I^+ - I^- = (1-\alpha)E\frac{T}{L}$$

with $$\begin{cases} I^+ = <i_L> + 1/2\Delta i_L \\ I^- = <i_L> - 1/2\Delta i \end{cases}$$

The mean value $<i_L>$ of the current through the inductor of inductance L varies depending on the type of converter:

• for a chopper (FIG. 1)

$$<i_L> = \frac{\alpha'}{\alpha} I_s$$

• for a single-phase inverter (FIG. 2)

$$<i_L> = \frac{2\alpha' - \alpha}{\alpha} I_s$$

• for a three-phase inverter (FIG. 3)

$$<i_L> = \frac{1}{\alpha} [\alpha'_1 I_{s1} + \alpha'_2 I_{s2} + \alpha'_3 I_{s3}]$$

FIGS. 2, 4, and 6 show that all of the switches are triggered naturally at zero voltage, so only switching off need to be controlled. The amplitude $\Delta i_L$ of the current ripple through the inductor L is the parameter that makes such operation possible.

Two events govern proper operation of such structures:

condition 1: for $i_L=I^-$, it is necessary to interrupt the voltage window of amplitude (1+k)E across the terminals of the converter branch(es); this stage makes it possible to establish the short circuit provided initially by the diodes of the branches and then continued by conduction through the adjacent controllable components; this interruption is performed by switching off the controllable switch $T_a$;

condition 2: for $i_L=I^+$, the short circuit stage provided by the branches must be interrupted, thereby starting the voltage window of amplitude (1+k)E; this stage enables the auxiliary diode $D_a$ to conduct and thus prepares natural priming of the switch $T_a$; interruption is achieved by switching off one of the two switches in each branch.

Chopper (FIGS. 1 and 2)

When $i_L=I^-$, it is necessary to ensure that the switch $T_a$ is in the conductive state. Assuming that is less than α, then the expression for the current flowing through the switch $T_a$ is:

$i_{Ta} = -I^-$
with $$\begin{cases} I^- = <i_L> - 1/2\Delta i \\ <i_L> = \frac{\alpha'}{\alpha} I_s \end{cases}$$

The condition for switch $T_a$ to conduct at instant αT is therefore given by:

$\Delta i_L \geq 2\alpha'/\alpha I_s$

If it is desired to sweep through the entire output voltage range (0<α'<α), then condition 1 becomes:

$\Delta i_L \geq 2I_s$ (condition 1)

When $i_L=I^+$, to interrupt the short circuit stage, it is necessary to switch off $T_2$ (FIG. 1). In which case, the following applies:

$i_{T2} = I^+ - I_s = \frac{\alpha'}{\alpha} I_s + \frac{\Delta i_L}{2} (-I_s)$

The condition for conduction by the switch $T_2$ for $i_L=I^+$, is thus given by:

$\Delta i_L \geq 2\frac{\alpha-\alpha'}{\alpha} I_s$

If it is desired to scan through the entire output voltage range (0<α'<α), condition 2 becomes:

$\Delta i_L \geq 2I_s$ (condition 2)

For a chopper, conditions 1 and 2 are identical.

Single-phase inverter (FIGS. 3 and 4)

When $i_L=I^-$, it is necessary to ensure that the switch $T_a$ is in the conductive state. Assuming that α' is less than α, the expression for the current flowing through the switch $T_a$ is:

$i_{Ta} = I^- + i_0$
with $$\begin{cases} I^- = <i_L> - 1/2\Delta i \\ <i_L> = ((2\alpha' - \alpha)/\alpha)I_s \\ i_0 = -I_s \end{cases}$$

in which relationships $i_0$ is the current at the input of the inverter. Since this current is negative, the current ripple must be greater in order to guarantee that the switch $T_a$ conducts:

$\Delta i_L \geq 4\alpha'/\alpha I_s$

If it is desired to scan through the entire output voltage range (0<α'<α), condition 1 becomes:

$\Delta i_L \geq 4I_s$ (condition 1)

When $i_L=I^+$, to interrupt the short circuit stage, it is necessary to switch off the switches $T_2$ and $T_3$. Assuming that the impedances in the conductive state of all of the switches are accurately symmetrical, this gives:

$i_{T2}=i_{T3}=½I^+ -½I_s -½((2\alpha'-\alpha)/\alpha)I_s +½\Delta i_L -½I_s$

The condition for conduction by the switches $T_2$ and $T_3$ when $i_L=I^+$, is thus given by:

$\Delta i_L \geq 4\frac{\alpha-\alpha'}{\alpha} I_s$

If it is desired to scan through the entire output voltage range (0<α'<α), condition 2 becomes:

$\Delta i_L \geq 4I_s$ (condition 2)

Conditions 1 and 2 are identical for both of the two different operating modes, namely:

α'=α for condition 1 and

α'=0 for condition 2.

Three-phase inverter (FIGS. 5 and 6)

Observe initially that the fact that neutral is floating at the three-phase end requires the total current to be zero:

$I_{s1}+I_{s2}+I_{s3}=0$

This means that at least one of the three currents is negative so it is essential for control of the corresponding branch to be set to the right (branch 3 in FIG. 5).

FIG. 6 shows an operating point at the scale of the PWM control period. At low frequency, three balanced sinewave currents are available at the output of the three-phase voltage inverter:

$$\begin{cases} i_1 = I_{max}\cos(\omega t - \phi) \\ i_2 = I_{max}\cos(\omega t - \phi - 2\pi/3) \\ i_3 = I_{max}\cos(\omega t - \phi - 4\pi/3) \end{cases}$$

and $$\begin{cases} I_{s1} = i_1(t_i) \\ I_{s2} = i_2(t_i) \\ I_{s3} = i_3(t_i) \end{cases}$$

in which relationships ψ is the phase difference between the voltage and the current in each phase individually.

When $i_L = \Gamma^-$, it is necessary to ensure that the switch $T_a$ is in the conductive state:

$$i_{Ta} = \Gamma^- + i_0 \text{ with}$$

$$\begin{cases} \Gamma^- = <i_L> - 1/2\Delta i \\ <i_L> = (1/\alpha)[\alpha'_1 I_s + \alpha'_2 I_{s2} + \alpha'_3 I_{s3}] \end{cases}$$

in which $i_0$ is the current at the input of the inverter. Assuming that the $\alpha'_i$ are less than $\alpha$, the expression for the current $i_0$, for $i_L = \Gamma^-$, is:

$$i_0 = \begin{cases} +I_{sj} \rightarrow \text{only } I_{sj} \text{ is negative} \\ -I_{sj} \rightarrow \text{only } I_{sj} \text{ is positive} \end{cases}$$

(with $j = 1,2,3$)

FIG. 7 shows the envelope of the current $i_0$ for $i_L = \Gamma^-$ in a balanced three-phase system.

Thus, when the switch $T_a$ is switched off, the current $i_0$:
is negative; and
has an absolute value that is of the same order as the maximum output current $I_{max}$.

To quantify the necessary current ripple, the most unfavorable case is taken into consideration:

$$I_{0min} = -I_{max}$$

Also, the mean value of the current flowing through the inductor L satisfies the following power relationship:

$$E \times <i_L> = 3 \frac{I_{max}}{\sqrt{2}} \times \frac{1/2E}{\sqrt{2}} \cos\phi \rightarrow <i_L>_{max} = \frac{3}{4} I_{max}$$

Thus, the expression for the current flowing through the switch $T_a$ under the most unfavorable conditions becomes:

$$i_{Tmin} = -\Gamma^-_{max} + i_{0min} \text{ with } \Gamma^- = <i_L>_{max} - 1/2\Delta i$$

Thus, the current ripple which guarantees conduction through the switch $T_a$ for $i_L = \Gamma^-$ in a balanced three-phase system satisfies the following inequality:

$$\Delta i_L \geq 7/2 I_{max} \quad \text{(condition 1)}$$

When $i_L = \Gamma^+$ at the end of the short circuit stage, the six controllable components ($T_1$ to $T_6$) must be conducting for the following two reasons:

firstly, in order to be able to interrupt the short circuit, it is essential to be able to switch off a controllable component in each branch; and secondly, at the beginning of the voltage window, it is necessary in each branch for there to be a controllable component that has already been triggered so as to be able to vary the durations of the pulses.

Assuming that the impedances of all the switches are accurately symmetrical in the conductive state, the following expression is obtained for the currents when $i_L = \Gamma^+$:

$$\begin{cases} i_{T2j-1} = \frac{\Gamma^+}{3} + \frac{I_{aj-1}}{2} \\ i_{T2j} = \frac{\Gamma^+}{3} - \frac{I_{aj}}{2} \end{cases}$$

(with $j = 1,2,3$)

The condition for all six switches conducting for all output current values is therefore:

$$\Gamma^+ \geq \frac{3}{2} I_{max} \text{ with } \begin{cases} \Gamma^+ = \frac{\Delta i_L}{2} + <i_L> \\ <i_L> = \frac{3}{4} I_{max}\cos\phi \end{cases}$$

Which, gives rise to the following minimum current ripple:

$$\Delta i_L \geq 3 I_{max}(1 - \frac{1}{2}\cos\psi) \quad \text{(condition 2)}$$

For example, for $\cos\psi = 0.7$, $\Delta i_L$ must be greater than about $2 I_{max}$.

With an inductive load ($\cos\psi > 0$), condition 2 is less constraining than condition 1.

In conclusion, two events govern proper operation of the circuits under consideration:

condition 1: for $i_L = \Gamma^-$, it is necessary to interrupt the voltage window of amplitude $(1+k)E$ across the branch (es) of the converter; this makes it possible to trigger the auxiliary controllable component $T_a$ of the interface at zero voltage;

condition 2: for $i_L = \Gamma^+$, the short circuit stage provided by the branches must be interrupted, thereby starting the voltage window of amplitude $(1+k)E$; this makes it possible to trigger the auxiliary controllable component $T_a$ of the interface at zero voltage.

The following table summarizes the values of the current ripples that stem from the above two conditions, depending on which converter is in use (and assuming for the second condition that all of the switches are accurately symmetrical in the conductive state):

|  | Chopper | Single-phase ripple | Three-phase ripple |
|---|---|---|---|
| condition 1: switching off $T_a$ | $\Delta i_L \geq 2 I_s$ ($\alpha' = \alpha$) | $\Delta i_L \geq 4 I_s$ ($\alpha' = \alpha$) | $\Delta i_L \geq \frac{7}{2} I_{max}$ |
| condition 2: switching off $T_i$ | $\Delta i_L \geq 2 I_s$ ($\alpha' = 0$) | $\Delta i_L \geq 4 i_s$ ($\alpha' = \alpha$) | $\Delta i_L \geq 3 I_{max}(1 - \frac{1}{2}\cos\phi)$ |

But, for single-phase and three-phase inverters the ripple must be greater than about $4 I_s$.

Such a current ripple is a difficult constraint for dimensioning the inductor L and the capacitor C (large rms currents), and the semiconductor components (surge currents associated with the amplitude $\Delta i_L$).

Thus, with choppers, the minimum ripple is about $2 I_s$ and can be considered as being acceptable. However, for single-phase and three-phase voltage inverters, the ripple must exceed $4 I_s$: economically acceptable use of inverters of the above-specified type thus requires this constraint to be reduced.

SUMMARY OF THE INVENTION

The invention therefore seeks essentially to remedy the above-mentioned drawbacks and it provides an improved method of controlling and an improved structure for a semiconductor static electric power converter operating with soft switching in zero-voltage mode and controlled with pulse width modulation, said converter including converter means having at least one branch of controllable bidirectional current switches that switch in "zero-voltage" mode, with the midpoint thereof connected to the load, and also including, in series between its DC voltage input and said converter means, an interface constituted by an inductor and, in parallel therewith, a capacitor and an auxiliary controllable bidirectional current switch that switches in "zero-voltage" mode, control means for said switches being organized so that:

when the ripple current through the inductor of said interface is equal to a minimum value relative to a mean value ($i_L = <i_L> - \frac{1}{2}\Delta i_L$), a voltage window of amplitude (1+k)E at the terminals of the branch(es) of the converter is interrupted by switching off the auxiliary switch so as to enable the switches of the converter branch(es) to trigger under zero voltage; and when the current flowing through the inductor of said interface is equal to a maximum value relative to said mean value ($i_L = <i_L> + \frac{1}{2}\Delta i_L$), the short circuit stage provided by the branch(es) is interrupted and the beginning of the voltage window of amplitude (1+k)E is initiated by switching off one of the controllable switches in each branch, thereby enabling the auxiliary controllable switch of the interface to be triggered under zero voltage.

To this end, a method of the invention for controlling a converter of the above-specified type is essentially characterized in that immediately before the end of the voltage window of amplitude (1+k)E, a positive current is caused to flow through the auxiliary controllable switch so as to compensate, at least in part, for the current at the input of the converter means, which may be negative when the ripple current in the inductor is equal to its above-mentioned minimum value, so as to reduce the amplitude of the current ripple required for switching off said auxiliary controllable switch; and in that immediately before the end of the short circuit stage, a positive current is caused to flow through the controllable switches of each of the branches of the converter means when the ripple current in the inductor is equal to its above-mentioned maximum value;

thereby reducing the current ripple amplitude required in said above-mentioned inductor for enabling the auxiliary controllable switch and the controllable switches of each of the branches of the converter means to operate in "zero-voltage" mode.

Similarly, a static converter of the above-specified type, and organized in accordance with the invention, is essentially characterized in that it further includes a second interface connected to the point where the above-mentioned first interface is connected to the converter means, said second interface including means organized, immediately before the end of the voltage window of amplitude (1+k)E to cause a positive current to pass through the auxiliary controllable switch suitable for countering at least in part the current at the input of the converter means which is negative when the ripple current in the inductor is equal to its above-mentioned minimum value, thereby reducing the current ripple amplitude required for switching off said auxiliary controllable switch, and in that said second interface is also organized to reduce the current ripple required for controlling interruption of said short circuit stage provided by the converter branch(es).

As already mentioned above, minimal ripple can be considered as being acceptable for chopper type converters. Thus, although the means specific to the present invention are applicable to any type of converter as specified above, and thus in particular to chopper type converters, it is nevertheless more specifically to inverter type converters (single-phase or three-phase) that the dispositions of the invention will find their most advantageous application.

Under such conditions, a preferred implementation of the method of the invention for a converter constituted by an inverter is characterized in that, in an auxiliary inductor connected to the input terminal of the converter means, immediately before the end of the voltage window of amplitude (1+k)E, a linear current charge is put through the auxiliary inductor which is subjected to a voltage (1+k)E;

and then at the end of said voltage window, the auxiliary switch of the first interface is switched off with the conduction thereof then being provided by the presence of the positive current generated by said second interface and which triggers the short circuit in the branches of the converter means; and the auxiliary inductor is subjected to a voltage $-(1+k)E$ which is caused to discharge until its current is cancelled;

whereby the current ripple amplitude required for switching off said auxiliary controllable switch is reduced; and in that the current flow controls in said auxiliary inductor are made reversible, whereby the current ripple amplitude required for interrupting said above-mentioned short circuit stage by means of the branches of the inverter is reduced.

In this case, a first preferred embodiment of a converter of the invention having an inverter type structure is characterized in that the second interface includes:

an auxiliary inductor connected to the input terminal of the converter means;

controllable switch means for allowing current to be charged linearly in said inductor subjected to a voltage (1+k)E immediately before interruption of said voltage window of amplitude (1+k)E and for interrupting said charging when said window is interrupted;

means for discharging said inductor under a voltage $-(1+k)E$ starting from the interruption of said above-mentioned voltage window; and said controllable switch means for charging and said discharge means being bidirectional with respect to current.

Advantageously, in this case the controllable bidirectional switch means for charging the inductor comprise a controllable switch and a diode connected in antiparallel between the free terminal of the auxiliary inductor and the other input terminal of the converter means; and the means for discharging the auxiliary inductor comprise a diode and a controllable switch connected in antiparallel between said free terminal of the auxiliary inductor and the terminal of the capacitor which is connected to the auxiliary switch of said above-mentioned first interface.

A second preferred implementation of the method of the invention for a converter of the inverter type is characterized in that in an auxiliary inductor connected between the input terminal of the converter means and the input DC voltage source:

immediately before the end of the voltage window of amplitude (1+k)E, a linear current charge is put through the auxiliary inductor which is subjected to a voltage kE;

then, at the end of said voltage window, the auxiliary switch of the first interface is switched off with the conduction thereof then being provided by said second interface and which triggers the short circuit in the branches of the converter means;

the auxiliary inductor is subjected to a voltage −E and caused to discharge until its current has been cancelled;

whereby the current ripple amplitude required for switching off said auxiliary switch of the first interface is reduced; and in that the current flow controls through said auxiliary inductor are made reversible, whereby the current ripple amplitude required for controlling interruption of said above-mentioned short circuit phase in the branches of the inverter is reduced.

In this case, a second preferred embodiment of a converter of the invention having an inverter type structure is characterized in that the second interface includes:

an auxiliary inductor connected to the input DC voltage source; and controllable switch means connected between said auxiliary inductor and the input of the converter means to enable linear current charging of said inductor subjected to a voltage kE immediately before interruption of said voltage window of amplitude (1+k)E and for initiating current discharge through the inductor under the inverse input voltage on interruption of said window.

Advantageously, in this case, the controllable switch means for charging and discharging the auxiliary inductor comprise two triggerable switches each capable of conveying current in one direction only, said switches being connected in antiparallel between said auxiliary inductor and the input of the converter means.

A third preferred implementation of the method of the invention for a converter of the inverter type is characterized in that in an oscillating circuit including an auxiliary inductor and an auxiliary capacitor connected in series across the input terminals of the converter means:

immediately before the end of the voltage window of amplitude (1+k)E, oscillating conditions are induced in the oscillating circuit, with voltage forced conditions existing across the terminals of the auxiliary capacitor, using a voltage of value (1+k)E;

then, at the end of said voltage window, the auxiliary switch of the first interface is switched off and a short circuit is triggered in the arms of the converter means, the forced conditions of the oscillating circuit then cancelling, and the auxiliary inductor is caused to discharge with the voltage across the terminals of the auxiliary capacitor being made negative so as to establish a negative current flow that is substantially constant through the loop constituted by the auxiliary inductor, the auxiliary capacitor, and the short circuit branches of the converter means, the inductor of the first interface continuing to charge via the DC voltage source; and finally when the current through the inductor of the first interface reaches its maximum value ($i_L = I^+$), the short circuit of the branches of the converter means is interrupted and a voltage window of amplitude (1+k)E is triggered by causing the current through the auxiliary inductor to increase until it is cancelled.

In this case, a third preferred embodiment of a converter of the invention having an inverter type structure is characterized in that the second interface includes connected in series across the input terminals of the converter means:

an auxiliary inductor;

a capacitor co-operating with the inductor to constitute an oscillating circuit;

controllable bidirectional switch means switching in "zero-voltage" to allow the circuit to oscillate under forced conditions at a voltage (1+k)E immediately before interruption of said voltage window of amplitude (1+k)E and to interrupt said oscillation at the end of said window; and means for short circuiting the capacitor of the oscillating circuit being provided to enable the inductor to be charged at the beginning of said voltage window.

Advantageously, in this case, the controllable bidirectional switch means comprise a controllable switch and a diode connected in antiparallel, and the means for short circuiting the capacitor of the oscillating circuit comprise a diode connected in the opposite direction.

Thus, by the means implemented in the invention, a considerable reduction is achieved in those effects that are harmful in determining both the characteristics of the components of the first interface and the amplitude of current ripple required for controlling the auxiliary switch of the first interface, in particular in inverter type converters (e.g. single-phase or three-phase) in which said ripple is particularly large.

BRIEF DESCRIPTION OF THE DRAWINGS

The invention will be better understood on reading the following detailed description of certain preferred implementations which are given solely as non-limiting examples. In the description, reference is made to the accompanying drawings, in which.

DESCRIPTION OF THE PREFERRED EMBODIMENTS

It is recalled initially that the expression for the current through the auxiliary controllable switch $T_a$ when $i_L=I^-$ is as follows:

$$i_{Ta}=-I^-+i_o$$

Figure 1:
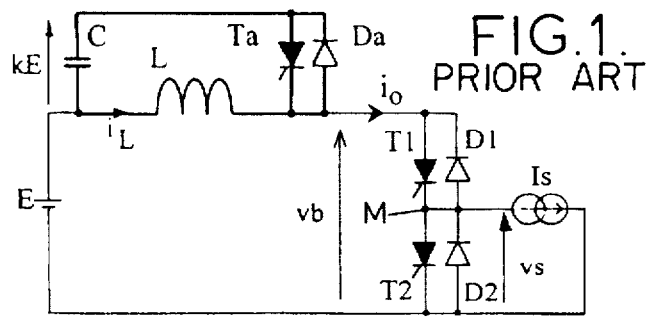
FIG. 1 shows a schematic circuit diagram of a basic chopper type circuit.
Figure 2:
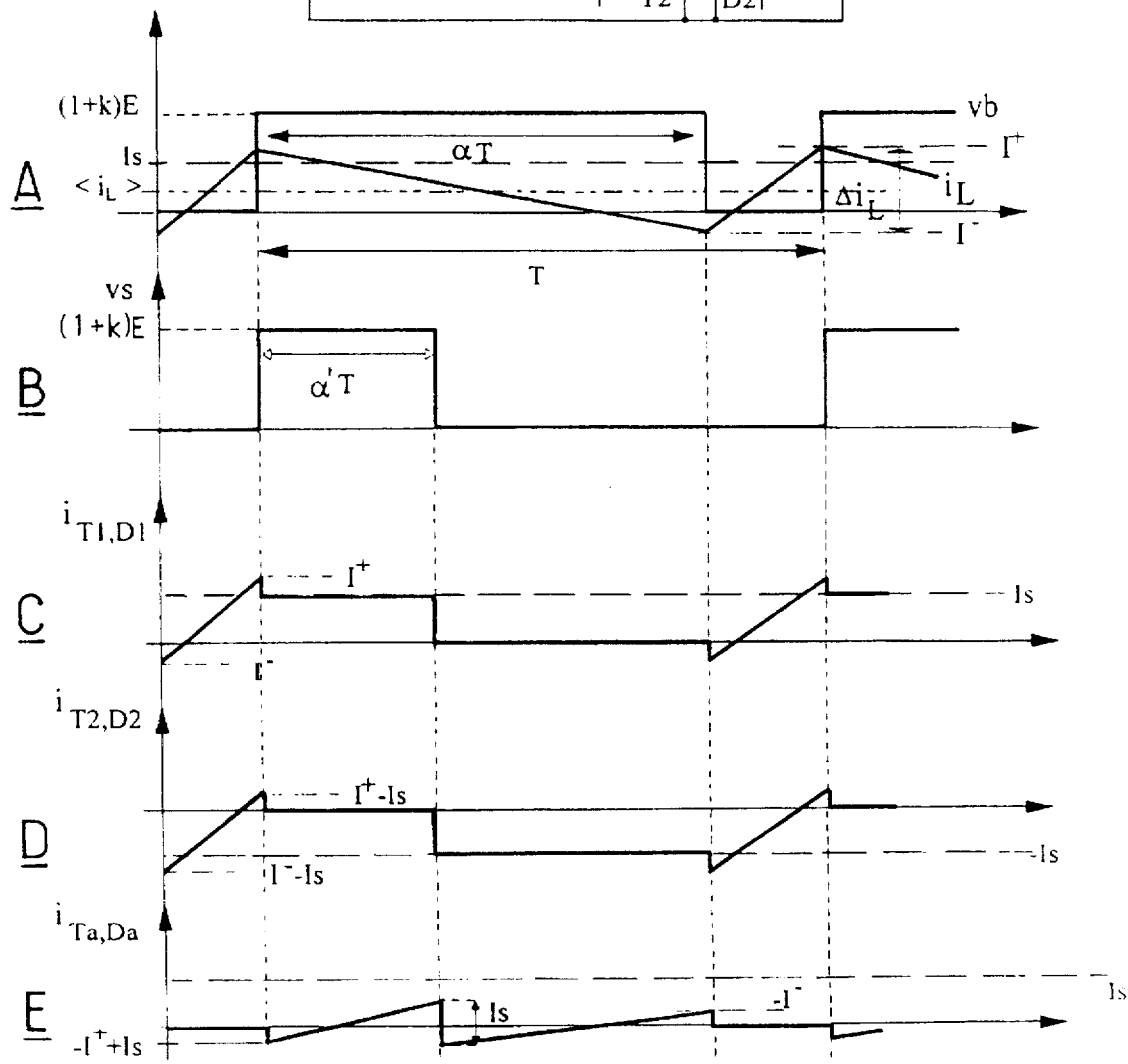
FIG. 2 shows waveforms associated with the circuit of FIG. 1.
Figure 3:
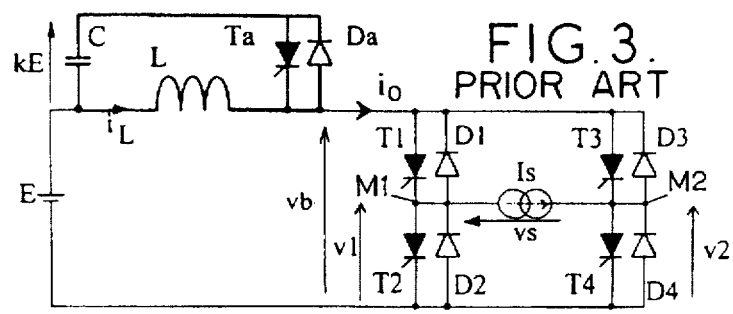
FIG. 3, shows a schematic circuit diagram of a single-phase inverter.
Figure 4:
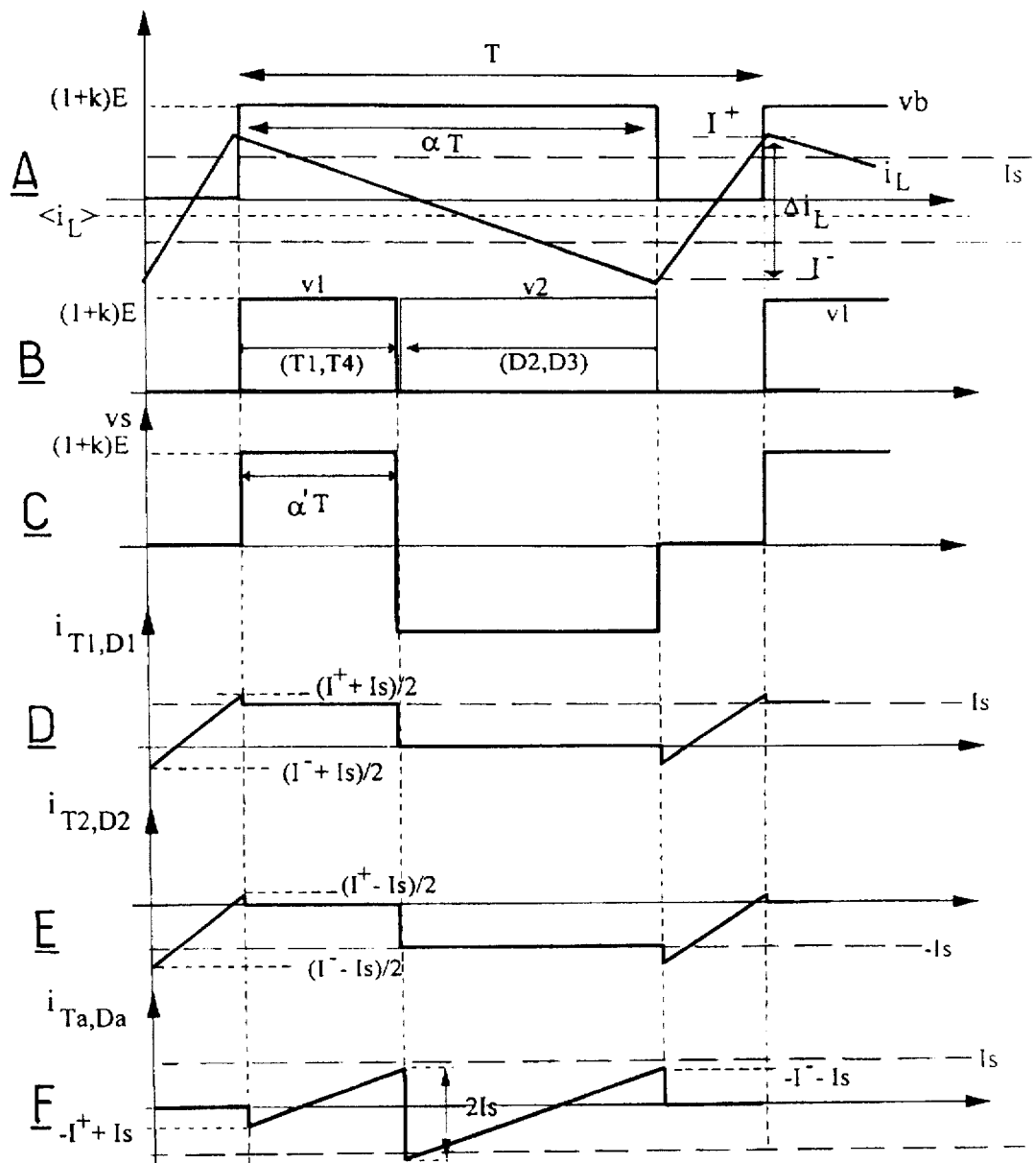
FIG. 4, shows waveforms associated with the circuit of FIG. 3.
Figure 5:
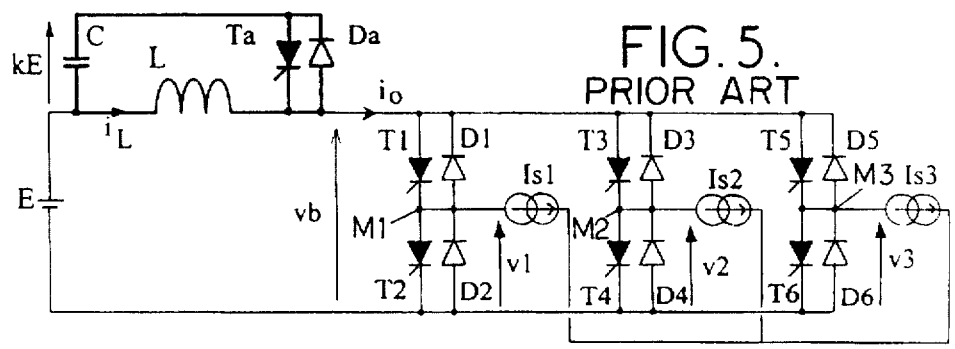
FIG. 5, shows a schematic circuit diagram of a three-phase inverter.
Figure 6:
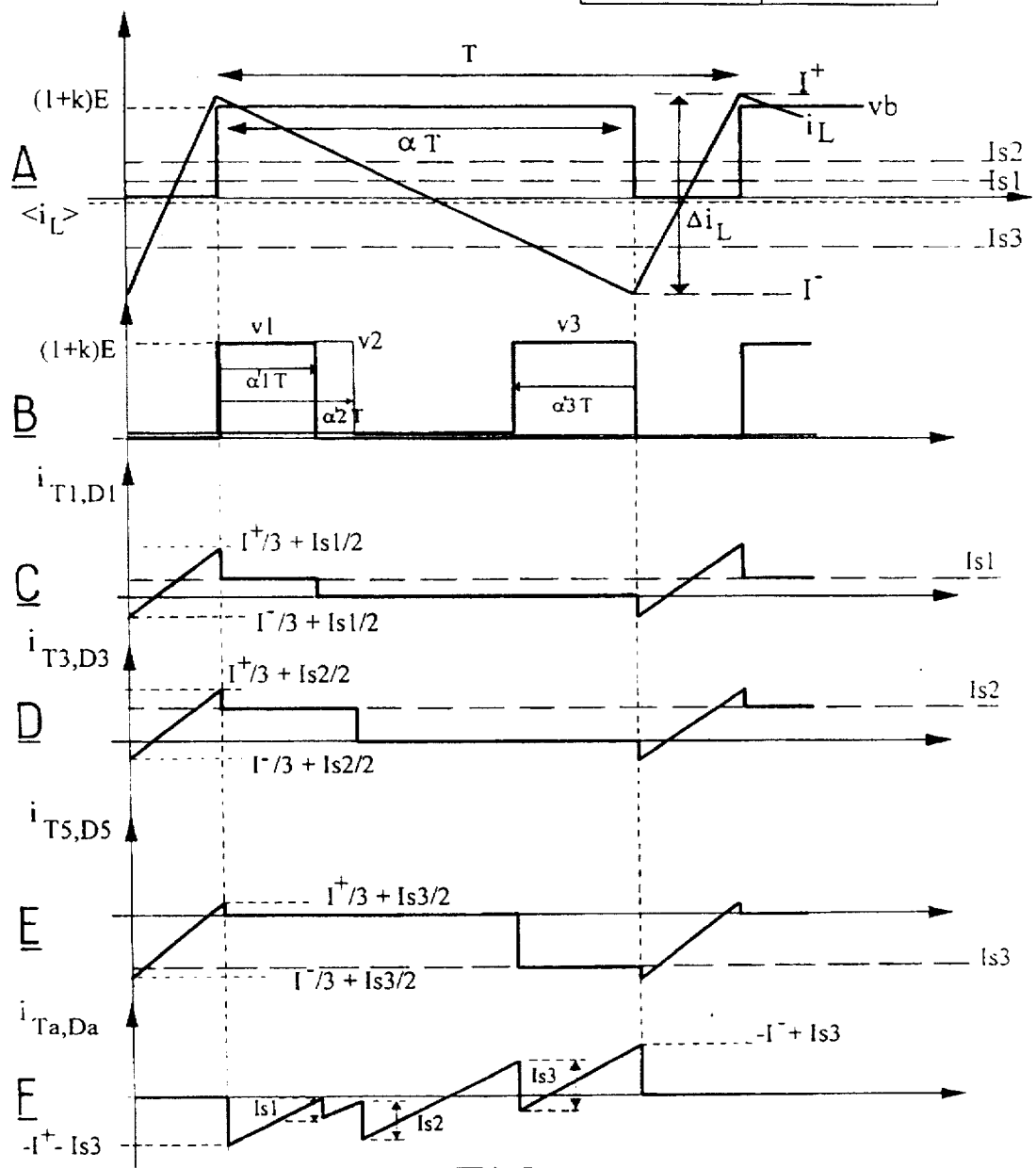
FIG. 6, shows waveforms associated with the circuit of FIG. 5.
Figure 7:
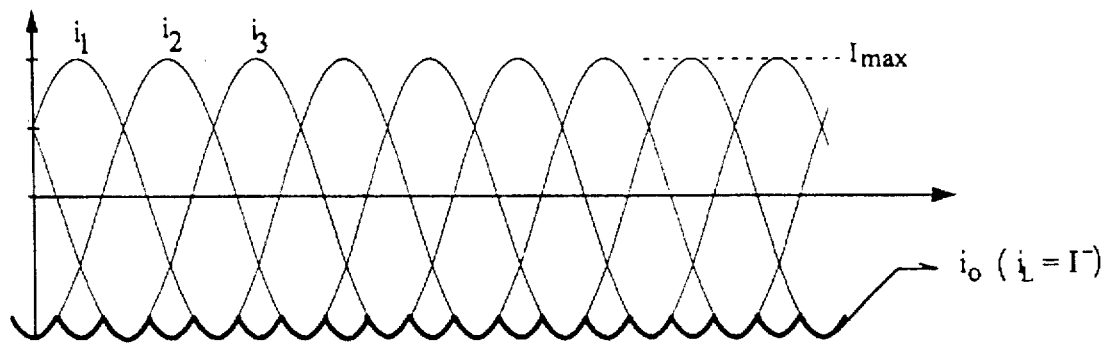
FIG. 7, shows a current envelope for a balanced three-phase system.

When the auxiliary switch $T_a$ is switched off, the instantaneous current $i_o$ at the input of the converter is conveyed by the diodes of the branch(es) and consequently it is negative as can be seen in FIGS. 2, 4, and 6. That is why the current ripple that guarantees a conductive state for the auxiliary switch $T_a$ when $i_L=I^-$ must be large.

Figure 8:
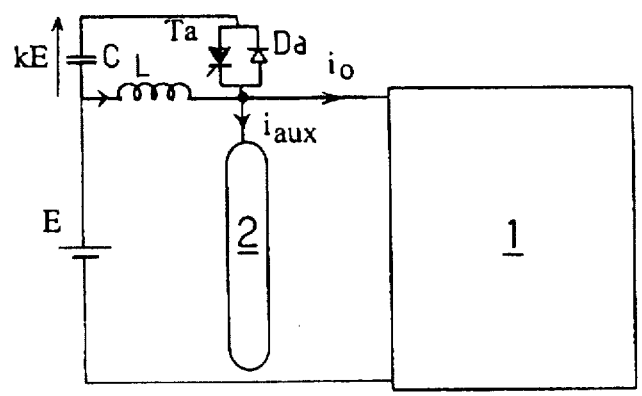
FIG. 8 is a highly diagrammatic representation of an inverter type converter organized in accordance with the invention.

To this end, provision is made in the invention to incorporate a second structure in the interface upstream from the converter so as to counter the negative current $i_o$ when $i_L=I^-$. FIG. 8 is a diagram showing the role of this interface (when $i_L=I^-$). In FIG. 8, the converter means are referenced 1, the second interface installed in application of the invention is referenced 2, and the current generated by said second interface is written $i_{aux}>0$.

The second interface 2 is connected to the input of the converter means, i.e. to the point where said abovementioned first interface is connected to the converter means. This second interface includes means organized to act immediately before the end of the voltage window of amplitude (1+k)E to pass a positive current $i_{aux}>0$ through the auxiliary switchable switch $T_a$ suitable for countering, at least in part, the current $i_o$ at the input of the converter means, which current $i_o$ is negative when the ripple current in the inductor is equal to said above-mentioned minimum value $i_L=I^-=<i_L>-\frac{1}{2}\Delta i_L$.

Using a single-phase inverter by way of example, the maximum constraint occurs when $\alpha'=\alpha$. The following relationships can then be written:

at instant $\alpha T$:

$$\begin{cases} i_L = I^- = <i_L> - 1/2\Delta i_L = I_s - 1/2\Delta i \\ i_o = -I_s \\ i_{aux} = I^-_{aux} > 0 \end{cases}$$

Thus:

$$i_{Ta/\alpha T} = -i_L + i_o + i_{aux} = -2I_s + \frac{1}{2}\Delta i + I^-_{aux} \geq 0$$

giving the following relationship:

$$\Delta i_s \geq 4I_s - 2I^-_{aux}$$

It is clear that ripple amplitude is attenuated by the action of the second interface. In particular, if $I^-_{aux}=I_s$, then the system returns to a minimum ripple of $2I_s$, mentioned above for the chopper case.

In addition, the second interface 2 is organized to cause at least a reduction in the current ripple required for controlling interruption of the short circuit stage provided by the branch (es) of the converter, so that condition 2 is satisfied simultaneously.

Various implementations of the second interface are described below. Although both reducing the amplitude of current ripple required for switching off the auxiliary switch $T_a$ of the first interface, and reducing the amplitude of current ripple required for interrupting the short circuit stage of the branch(es) of the converter means are advantageous goals in all types of static converter, reducing the abovementioned ripple amplitudes is necessary most particularly in static converters of the inverter type (single-phase or three-phase, in particular).

Preferred embodiments of the second interface are therefore described below for applications to making inverters.

Figure 9:
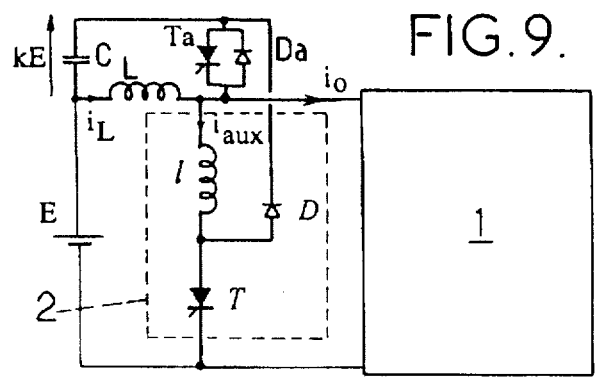
FIG. 9 is a circuit for a first preferred embodiment of the inverter type converter of FIG. 8 in a partial configuration that satisfies above-mentioned condition 1.

The simplified circuit diagram of a first embodiment of the second interface is given in FIG. 9. This second interface has an auxiliary inductor 1 with one terminal connected to the input of the converter means 1 and with its other terminal connected to the anode of a controllable static switch T. The cathode of the switch is connected to ground. The abovementioned other terminal of the inductor 1 is also connected to the anode of a diode D whose cathode is connected to the anode of the auxiliary controllable static switch $T_a$ of the first interface, which is also connected to the capacitor C.

In this case, the second interface 2 operates in chopper mode:

During a stage 1:

Immediately before instant $\alpha T$, i.e. before the end of the voltage window of amplitude (1+k)E, the switch T in the second interface 2 is triggered; this causes current to be charged linearly in the inductor 1 which is subjected to the voltage (1+k)E:

$$(1+k)E = l\frac{di_{aux}}{dt}$$

Then during a stage 2:

At instant $\alpha T$, i.e. at the end of said voltage window, the currents flowing through the two inductors 1 and L are as follows:

$$\begin{cases} i_l = I^+_{aux} \\ i_L = I^- \end{cases}$$

at this instant, both switches are controlled to switch off:

firstly, the auxiliary controllable switch $T_a$ of the first interface whose conduction is guaranteed from then on by the presence of the current $I^+_{aux}$; this triggers the short circuit provided by the branches of the inverter 1; and secondly, the switch T of the second interface 2 whose switching off triggers conduction through the diode D; whereupon the inductor 1 which becomes subjected to the voltage $-(1+k)E$ discharges through the diode D until the current therethrough has been cancelled:

$$-(1+k)E = l\frac{di_{aux}}{dt}$$

Figure 10:
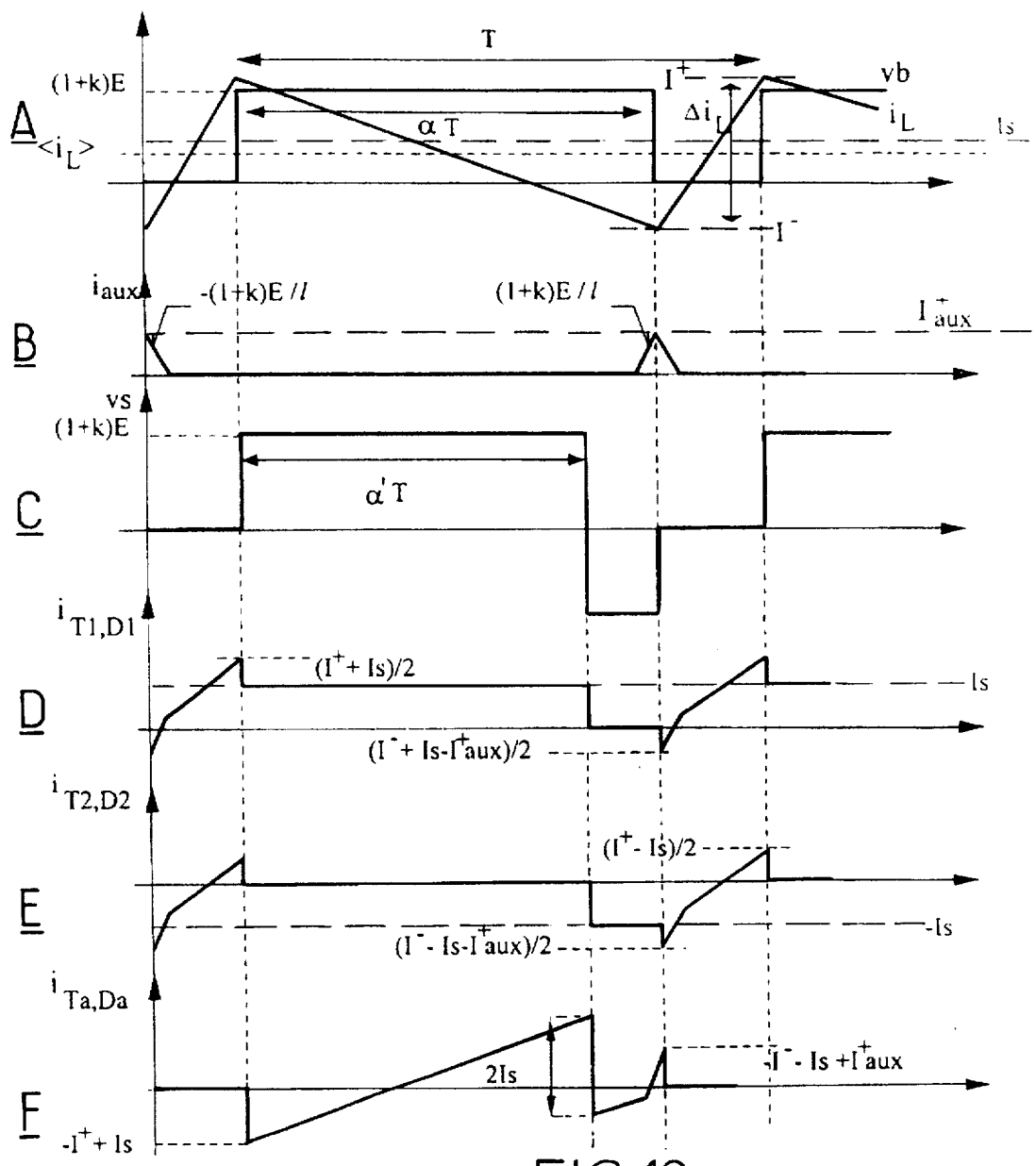
FIG. 10 is a set of graphs A to F showing various voltages and currents in the FIG. 9 converter when configured as a single-phase inverter.

FIG. 10 shows the waveforms that stem from applying the above structure to a single-phase inverter controlled with ±E modulation. In FIG. 10:

graph A shows the voltage window of amplitude $(1+k)E$ and of duration $\alpha T$ and the current $i_L$ flowing through the inductor L;

graph B shows the positive current $i_{aux}$ generated by the second interface 2 to counter the current $i_0$ at the input to the converter branches;

graph C shows the output voltage $V_s$ at the terminals of the load, with a positive voltage pulse of adjustable duration $\alpha'T$;

graphs D and E show respectively the currents flowing through the controlled switches of the first branches of the inverter, respectively $T_1,D_1$ and $T_2,D_2$; and graph F shows the current flowing through the auxiliary switch $T_a,D_a$ of the first interface.

Figure 11:
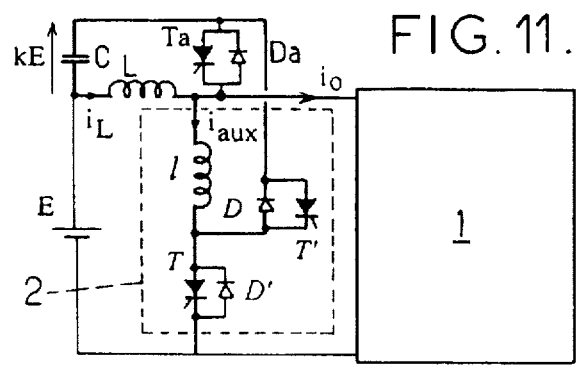
FIG. 11 is a circuit for the same preferred first embodiment of the inverter type converter as FIG. 8, in a complete configuration satisfying both above-mentioned conditions 1 and 2 simultaneously.

The circuit of FIG. 11 thus makes it possible to satisfy condition 1 by attenuating the current ripple amplitude required for switching off the auxiliary switch $T_a$.

Finally, to attenuate the current ripple amplitude required for switching off the main switches of the branches of the inverter 1 as set by above-mentioned condition 2, provision is made for the second interface 2 to be current-reversible. To this end, as shown in FIG. 11, a diode D' is connected in antiparallel with the switch T and a controllable switch T' is connected in antiparallel with the diode D.

Figure 12:
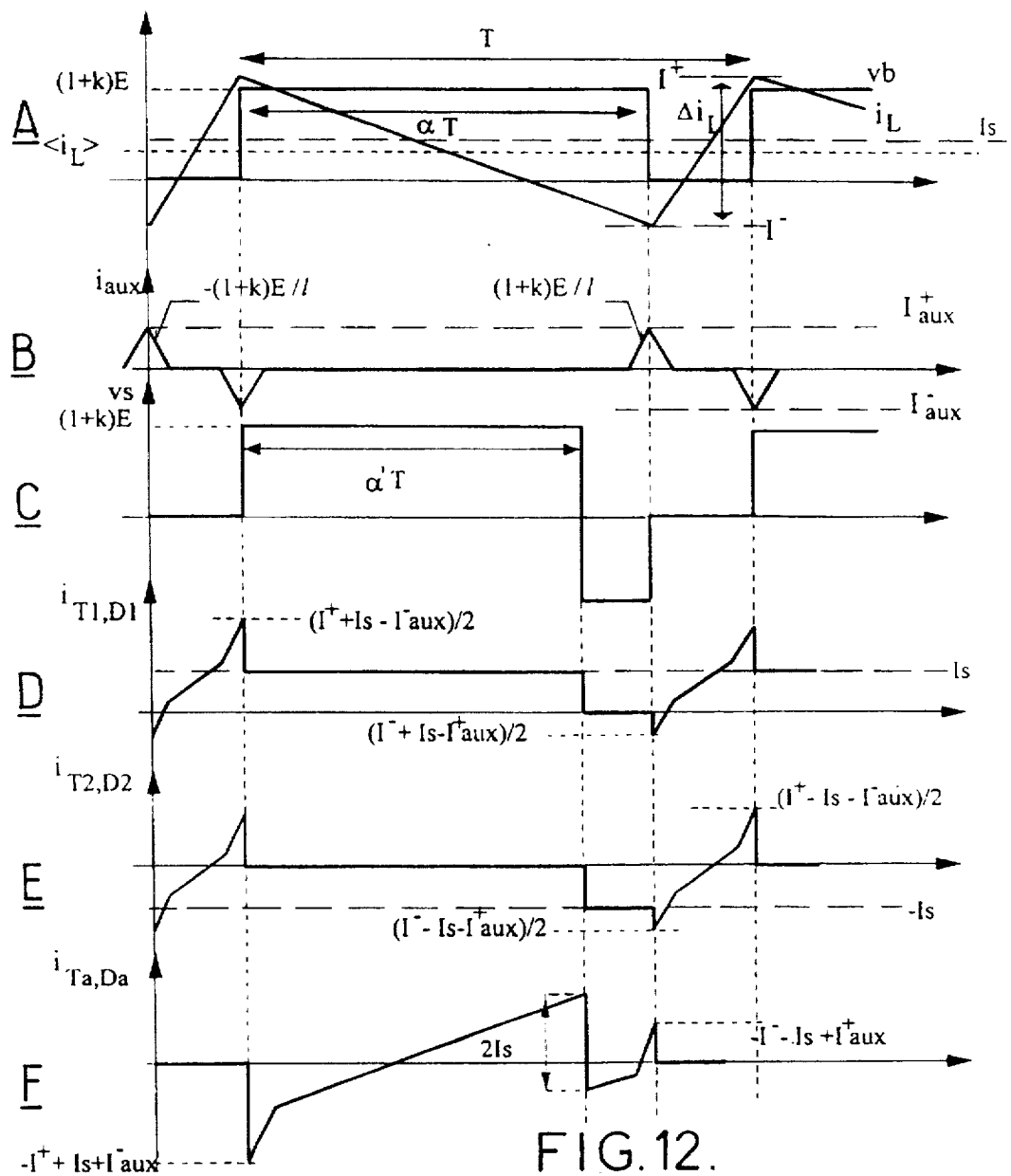
FIG. 12 is a set of graphs A to F showing the various voltages and currents in the FIG. 11 converter in a single-phase inverter configuration.

In FIG. 12, graphs A to F which apply to the circuit of FIG. 11 show current and voltage waveforms that correspond to the graphs A to F respectively of FIG. 10.

Thus, by triggering the switch T' immediately before the end of the short circuit provided by the branches of the inverter 1, at a time when the current flowing through the auxiliary inductor L is $i_L=\Gamma^+$, it is possible to guarantee a negative current $\Gamma_{aux}$. This reproduces the same condition 2 as before:

$$\Delta i_L \geq 4I_s-2|\Gamma_{aux}|$$

Thus the constraint on switch-off current ripple amplitude as imposed by satisfying condition 2 is indeed attenuated by the presence of the negative current $\Gamma_{aux}$.

Figure 13:
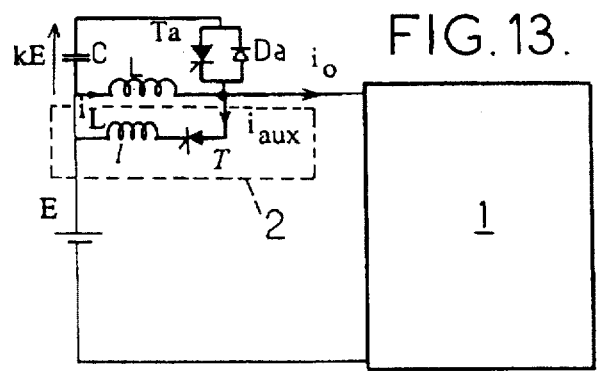
FIG. 13 is a circuit showing a second preferred embodiment of a FIG. 8 inverter type converter in a simplified configuration satisfying above-mentioned condition 1.

The simplified circuit diagram of a second embodiment of the second interface is given in FIG. 13. The second interface 2 includes an auxiliary inductor l in series with a switch T with controllable triggering, said interface being interposed between the positive DC input terminal and the input terminal of the converter means 1.

In operation, this second embodiment is similar to the first embodiment of FIG. 11. However, in this case the stages during which current is charged and discharged in the inductor l are provided by two different voltages during stage 1:

During stage 1:

Before instant $\alpha T$, i.e. before the end of the voltage window of amplitude $(1+k)E$, switch T is triggered; this causes current to be charged linearly in the inductor l which, in this case, is subjected to the voltage $kE$; as a result, to obtain the same current $I^{30}{}_{aux}$ as before, this stage must be triggered sooner:

$$kE = l\frac{di_{aux}}{dt}$$

During stage 2:

At instant $\alpha T$, i.e. at the end of the above-mentioned voltage window, the currents flowing through the two inductors l and L are:

$$\begin{cases} i_l = I^+_{aux} \\ i_L = I^+ \end{cases}$$

At this instant, the auxiliary switch $T_a$ of the first interface is non-conductive; this triggers the short circuit provided by the branches of the inverter 1; the inductor l which is then subjected to the voltage $-E$ then discharges through the switch T until its current has been cancelled:

$$-E = l\frac{di_{aux}}{dt}$$

Figure 14:
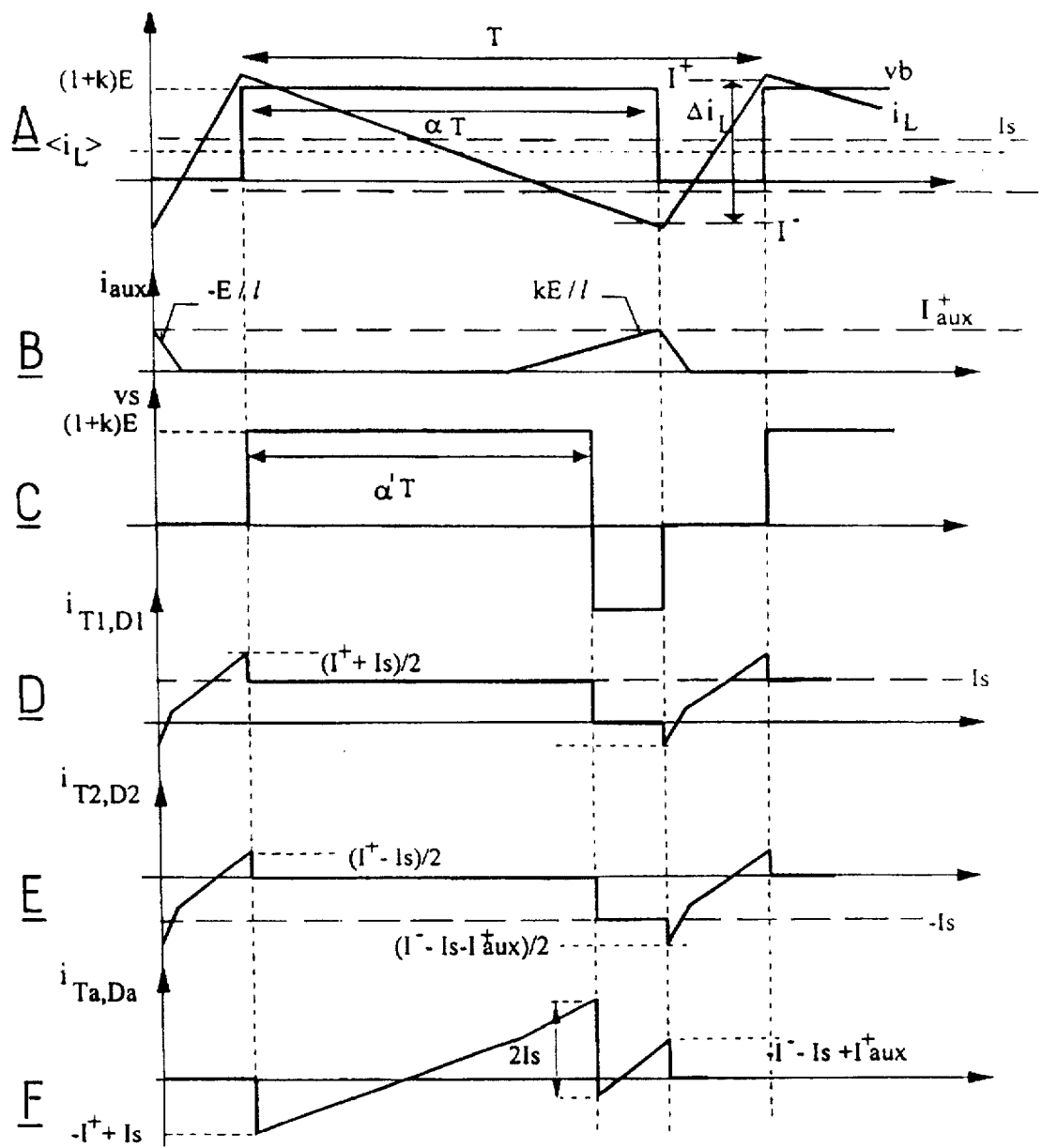
FIG. 14 is a set of graphs A to F showing various currents and voltages in the FIG. 13 converter when configured as a single-phase inverter.

FIG. 14 shows the waveforms of voltage and current that stem from applying this structure to a single-phase inverter controlled with ±E modulation. In FIG. 14, graphs A to F have the same meanings as respective graphs A to F in FIG. 10.

The circuit of FIG. 13 thus enables condition 1 to be satisfied while also providing spot attenuation of the current ripple amplitude required for switching off the auxiliary switch $T_a$.

Figure 15:
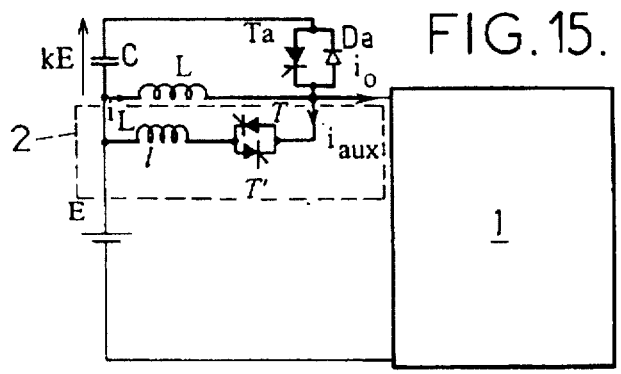
FIG. 15 is a circuit showing the same second preferred embodiment of the FIG. 8 inverter type converter in a complete configuration satisfying both above-mentioned conditions 1 and 2 simultaneously.

To manage also to attenuate the current ripple amplitude required for switching off the main switches in the branches of the inverter 1, as set by above-mentioned condition 2, provision is also made to cause the second interface 2 to be current-reversible. To this end, as shown in FIG. 15, a second triggerable switch T' is connected in antiparallel with the switch T. Thus, by triggering the switch T' immediately before the end of a short circuit in the branches of the inverter 1, when the current through the auxiliary inductor L is given by $i_L=\Gamma^+$, it is possible to guarantee a negative current $\Gamma_{aux}$. This gives the same condition 2 as before:

$$\Delta i_L \geq 4I_s-2|\Gamma_{aux}|$$

Thus, the constraint imposed for satisfying condition 2 concerning current ripple amplitude is attenuated by the presence of the negative current $\Gamma_{aux}$.

Figure 16:
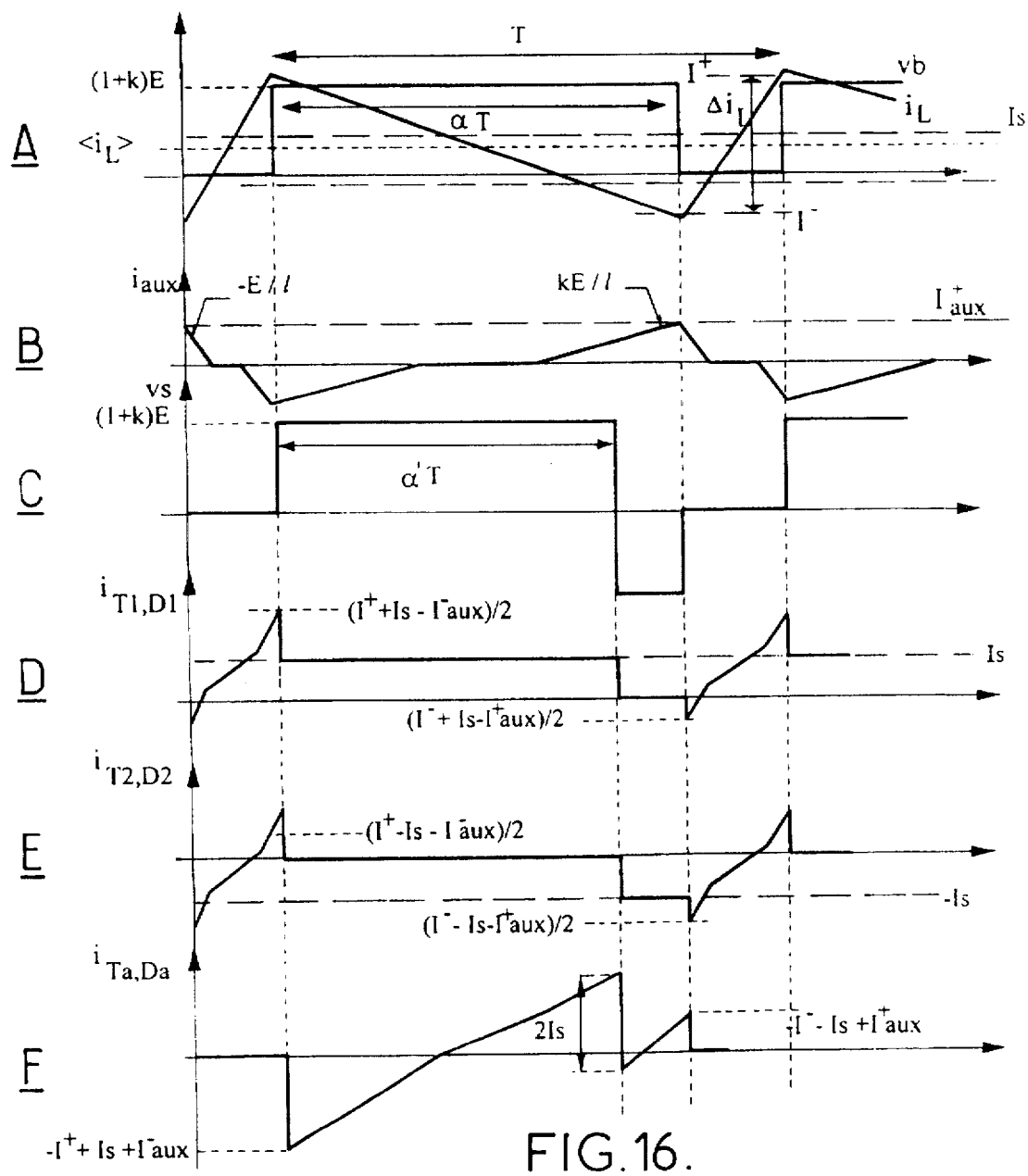
FIG. 16 is a set of graphs A to F showing various currents and voltages in the FIG. 15 converter when configured as a single-phase inverter.

In FIG. 16, graphs A to F show the current and voltage waveforms in the circuit of FIG. 15 and they have the same meanings as graphs A to F respectively of FIG. 14.

Figure 17:
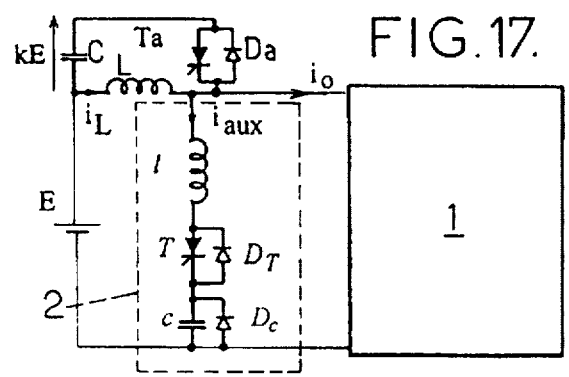
FIG. 17 is a circuit showing a third preferred embodiment of the FIG. 8 inverter type converter.

Finally, FIG. 17 shows the circuit diagram of a third preferred embodiment of the second interface. The second interface 2 comprises an auxiliary inductor l connected to the input of the converter means, and connected in series with a controlled switch T associated with a diode $D_T$ connected in antiparallel, itself in series with a capacitor c which is connected to ground and which is associated with an antiparallel diode $D_c$. The resulting lc circuit thus constitutes an oscillating interface which is combined with a triggerable switch T, and current through the inductor l takes place in oscillating manner. This circuit therefore operates in a manner that differs from that of the above two embodiments (FIGS. 11 and 15) and it takes place as follows (in the explanation below, reference is made to the graphs of FIG. 18 which show the voltage and current waveforms at various points of the circuit in FIG. 17 for a single-phase type inverter 1, with the graphs A to F having respectively the same meanings as those of FIGS. 10 and 14, while the diagram of FIG. 19 is a phase plane diagram showing how the lc oscillating circuit in the embodiment of FIG. 17 behaves):

During stage 1:

Immediately before instant αT, i.e. immediately before the end of the voltage window of amplitude (1+k)E, switch T is triggered; this starts oscillating conditions since the capacitor c is under forced voltage conditions (R.F.1 in FIG. 19) of value (1+k)E;

During stage 2:

At instant αT, i.e. at the end of the above voltage window, the currents flowing through the two inductors L and l are as follows:

$$\begin{cases} i_1 = I^-_{aux} \\ i_L = I^+ \end{cases}$$

(see FIGS. 18A and 18B)

At this instant, the auxiliary switch $T_a$ of the first interface is non-conductive; this triggers the short circuit provided by the branches of the inverter 1; the oscillating circuit changes forced conditions that become zero (R.F.2. in FIG. 19); the current flowing through the inductor l decreases to become negative, with the switch T then naturally being non-conductive and with the current flowing through the diode $D_T$; thereafter, when the voltage $V_c$ across the terminals of the capacitor c tends to become negative, the diode $D_c$ is triggered; the inductor l, the two diodes $D_c$ and $D_T$, and the branches of the inverter 2 then form a closed loop circuit; the current flowing through the inductor l thus remains constant having a negative value $I^-_{aux}$; during this time, the inductor L continues to charge linearly from the source E; and During stage 3:

When $i_1 = I^-_{aux}$ and $i_L = I^+$ (see FIGS. 18A and 18B), the short circuit is interrupted in the branches of the inverter 1; as a result the diode $D_a$ is triggered which imposes a voltage window of amplitude (1+k)E; the current through the inductor l then increases linearly until it is cancelled, with the diodes $D_T$ and $D_c$ then ceasing to conduct.

The phase plane of FIG. 19 reconstitutes the sequencing of the above three phases (phase 1 from A to B, phase 2 from B to C, and phase 3 from C to A).

It will be observed that the operating mode of the third preferred embodiment of FIG. 17 is such that above condition 2 relating to interrupting the short circuit stage as provided by the branches is also satisfied. As shown above, this short circuit stage is then interrupted when:

$$\begin{cases} i_1 = I^-_{aux} \\ i_L = I^+ \end{cases}$$

Figure 18:
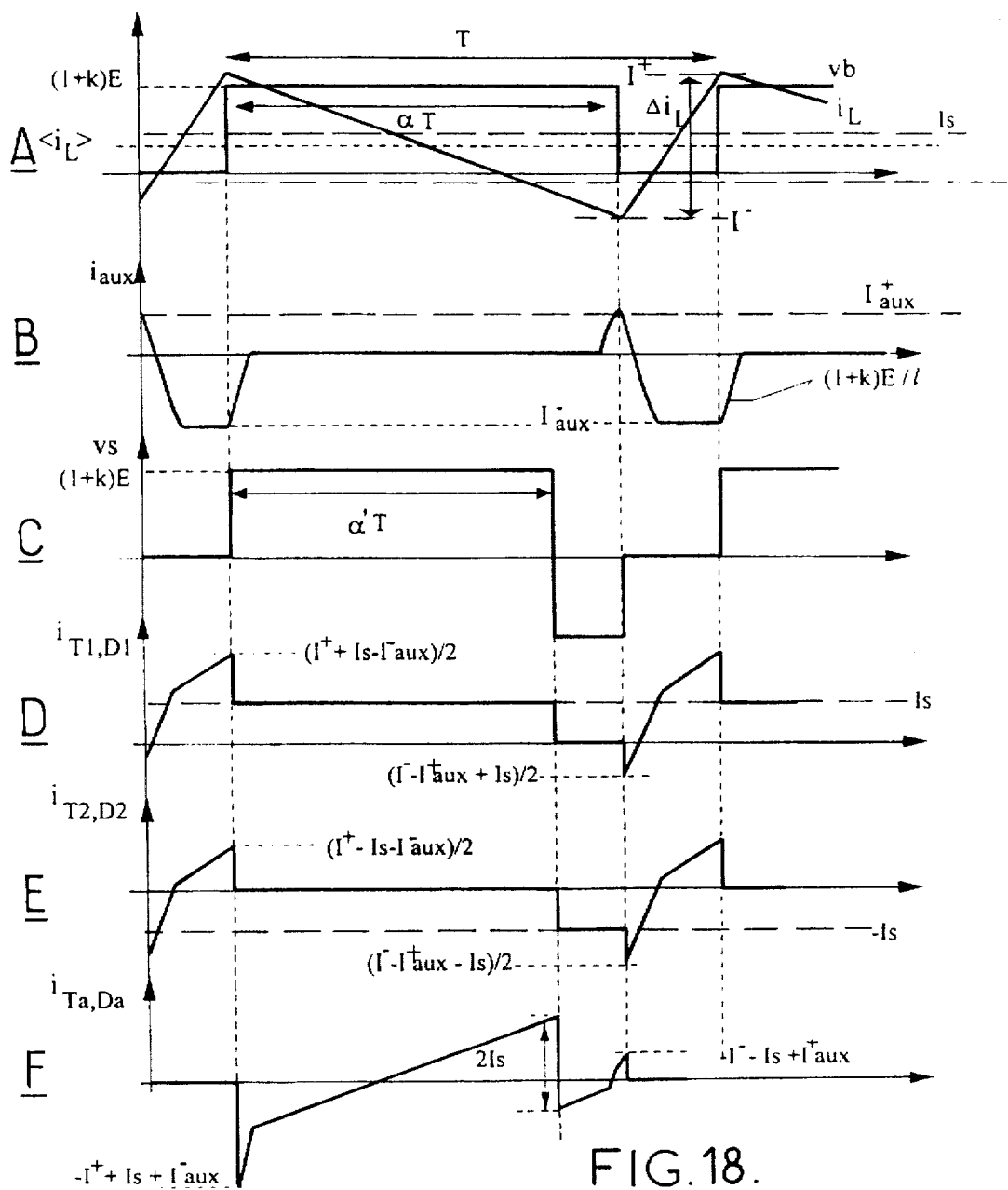
FIG. 18 is a set of graphs A to F showing various currents and voltages in the FIG. 17 converter when configured as a single-phase inverter.
Figure 19:
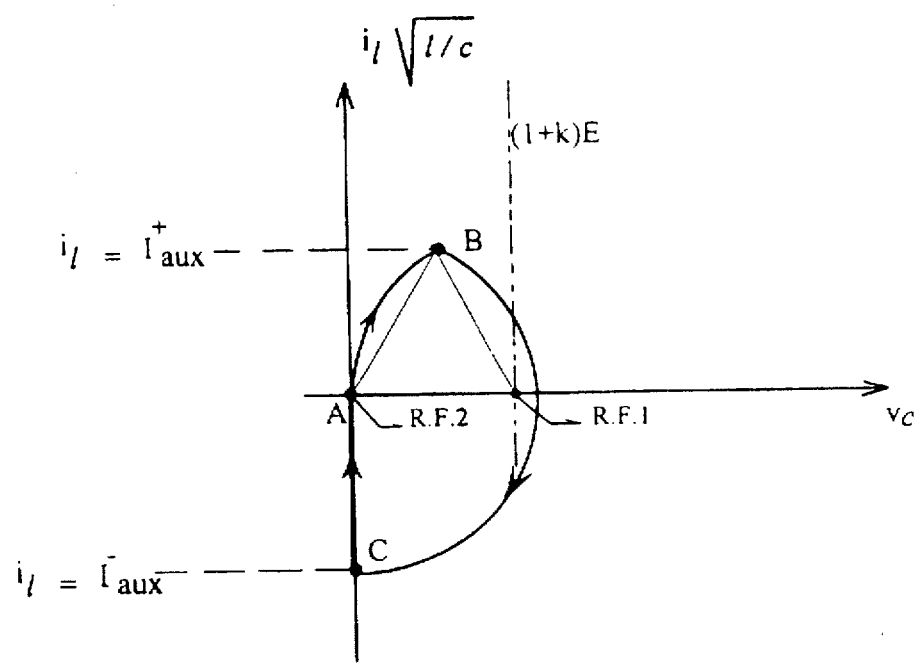
FIG. 19 is a diagram in the phase plane showing the operation of the FIG. 17 circuit.

In the case envisaged in FIG. 18 where the inverter 1 is of the single-phase type, interrupting the short circuit stage requires the main switches $T_2$ and $T_3$ to be switched off. Assuming that all of the switches have impedances in the conductive state that are accurately symmetrical, this gives rise to:

$$i_{T2} = i_{T3} = \tfrac{1}{2}(I^+ - I^-_{aux}) - \tfrac{1}{2}I_s$$

The condition for conduction in the switches $T_2$ and $T_3$ for $i_L = I^+$ is thus given by:

$$\Delta i_L \geq 4\frac{\alpha - \alpha'}{\alpha} I_s - |I^-_{aux}|$$

If it is desired to cover the entire output voltage range (0<α'<α), then condition 2 becomes:

$$\Delta i_L \geq 4 I_s - 2|I^-_{aux}| \quad \text{(condition 2)}$$

The constraint on current ripple amplitude attenuation as imposed by condition 2 is indeed satisfied by the presence of the negative current $I^-_{aux}$.

Naturally, and as can be seen from the above, the invention is not limited in any way to the applications and embodiments described more particularly; on the contrary, it extends to any variants thereof.

We claim:

1. A method of controlling a semiconductor static electric power converter, connected to a load and to a DC voltage source E forming a DC voltage input, operating with soft switching in a zero-voltage mode and controlled with pulse width modulation, said converter including converter means having at least one branch of controllable bidirectional current switches that switch in a zero-voltage mode, having an input and having a midpoint connected to the load, said converter further including, in series between said DC voltage input and said converter means, an interface comprising an inductor having a ripple current flowing therethrough, a capacitor connected in parallel with said inductor and having a voltage kE thereacross so that at least one branch has an input terminal voltage window of amplitude (1+k)E, an auxiliary controllable bidirectional current switch that switches in a zero-voltage mode, and control means for said switches providing that:

when the ripple current through the inductor of said interface is equal to a minimum value relative to a mean value thereof, the input terminal voltage window of amplitude (1+k)E of the at least one branch of the converter is interrupted by switching off the auxiliary controllable switch so as to enable the controllable bidirectional current switches of the at least one converter branch to trigger under zero voltage; and when the current flowing through the inductor of said interface is equal to a maximum value relative to said mean value, a short circuit stage provided by the at least one branch is interrupted and generating of the voltage window of amplitude (1+k)E is initiated by switching off one of said controllable bidirectional current switches in the at least one branch, thereby enabling the auxiliary controllable switch of the interface to be triggered under zero voltage;

said method further comprising:

immediately before the end of the voltage window of amplitude (1+k)E, a positive current is caused to flow through the auxiliary controllable switch so as to compensate, at least in part, for current flow at said input of the converter means, said current flow being negative when the ripple current in the inductor is equal to said minimum value, so as to reduce in amplitude the ripple current required for switching off said auxiliary controllable switch; and immediately before said short circuit stage ends, a positive current is caused to flow through the controllable switches of the at least one branch of the converter means when the ripple current in the inductor is equal to said maximum value;

thereby reducing in amplitude the ripple current required in said inductor for enabling the auxiliary controllable switch and the controllable switches of the at least one branch of the converter means to operate in said zero-voltage mode.

2. A method according to claim 1, wherein an auxiliary inductor is connected to the said input of the converter means, and wherein immediately before termination of the voltage window of amplitude (1+k)E, a linear current charge is put through the auxiliary inductor which is subjected to a voltage (1+k)E;

and then upon termination of said voltage window, the auxiliary switch of the first interface is switched off with conduction thereof then being provided by a positive current which is generated by a second interface, said conduction triggering said short circuit stage in the at least one branch of the converter means; and the auxiliary inductor is subjected to a voltage −(1+k)E which is caused to discharge until an associated current is cancelled;

whereby the current ripple amplitude required for switching off said auxiliary controllable switch is reduced; and wherein current flow controls in said auxiliary inductor are made reversible, whereby the current ripple amplitude required for interrupting said short circuit stage is reduced.

3. A method according to claim 1, wherein an auxiliary inductor is connected between said input of the converter means and the input DC voltage source, and wherein immediately before termination of the voltage window of amplitude (1+k)E, a linear current charge is put through the auxiliary inductor which is subjected to a voltage kE;

then, upon termination of said voltage window, the auxiliary switch of the first interface is switched off with conduction thereof then being provided by a second interface, said conduction triggering the short circuit in the at least one branch of the converter means;

the auxiliary inductor is subjected to a voltage −E and caused to discharge until current through the auxiliary inductor has been cancelled;

whereby the current ripple amplitude required for switching off said auxiliary switch of the first interface is reduced; and wherein current flow controls through said auxiliary inductor are made reversible, whereby the current ripple amplitude required for controlling interruption of said short circuit stage is reduced.

4. A method according to claim 1, wherein an oscillating circuit including an auxiliary inductor and an auxiliary capacitor is connected in series across said input of the converter means and wherein:

immediately before termination of the voltage window of amplitude (1+k)E, oscillating conditions are induced in the oscillating circuit, with voltage forced conditions existing across the auxiliary capacitor, using a voltage of value (1+k)E;

then, upon termination of said voltage window, the auxiliary switch of the first interface is switched off and a short circuit is triggered in the converter means, the forced conditions of the oscillating circuit then cancelling, and the auxiliary inductor is caused to discharge with the voltage across the auxiliary capacitor being made negative so as to establish a negative current flow that is substantially constant through a loop including the auxiliary inductor, the auxiliary capacitor, and short circuit branches of the converter means, the inductor of the first interface continuing to charge via the DC voltage source; and finally when the current through the inductor of the first interface reaches its maximum value, the short circuit stage of the at least one branch of the converter means is interrupted and a voltage window of amplitude (1+k)E is triggered by causing the current through the auxiliary inductor to increase until said current is cancelled.

5. A semiconductor static electric power converter connected to a load and to a DC voltage source E forming a DC voltage input, and operating with soft switching in zero-voltage mode and controlled by pulse width modulation, said converter including converter means having at least one branch of controllable bidirectional current switches that switch in a zero-voltage mode, said at least one branch having an input and having a midpoint connected to the load, said converter also including, in series between said DC voltage input and said converter means, an interface comprising an inductor having a ripple current flowing therethrough and, a capacitor connected in parallel with said inductor and having a voltage kE thereacross so that the at least one branch has an input terminal voltage window of amplitude (1+k)E and an auxiliary controllable bidirectional current switch that switches in a zero-voltage mode, and control means for said switches providing that:

when the ripple current through the inductor of said interface is equal to a minimum value relative to a mean value thereof, said input terminal voltage window of amplitude (1+k) E the at least one branch of the converter is interrupted by switching off the auxiliary switch so as to enable the switches of the at least one branch to trigger under zero-voltage; and when the current flowing through the inductor of said interface is equal to a maximum value relative to said mean value, a short circuit stage provided by the at least one branch is interrupted and generation of the voltage window of amplitude (1+k)E is initiated by switching off one of the controllable switches in the at least one branch, thereby enabling the auxiliary controllable switch of the interface to be triggered under zero-voltage;

said converter further including a second interface connected to a point where the first interface is connected to the converter means, said second interface including means for, immediately before termination of the voltage window of amplitude (1+k)E, causing a positive current to pass through the auxiliary controllable switch for countering, at least in part, current at the input of the converter means which is negative when the ripple current in the inductor is equal to said minimum value, thereby reducing the current ripple amplitude required for switching off said auxiliary controllable switch, and said second interface reducing the ripple current required for controlling interruption of said short circuit stage provided by the at least one converter branch.

6. A static electric power converter according to claim 5, wherein the second interface includes:

an auxiliary inductor connected to said input of the converter means;

controllable bidirectional switch means for allowing current to be charged linearly in said auxiliary inductor subjected to a voltage (1+k)E immediately before interruption of said voltage window of amplitude (1+k)E and for interrupting said charging when said window is interrupted; and bidirectional discharge means for discharging said inductor under a voltage −(1+k)E starting from the interruption of said voltage window.

7. A static electric power converter according to claim 6, wherein the controllable bidirectional switch means comprises a controllable switch and a diode connected in antiparallel between a free terminal of the auxiliary inductor and an input terminal of the converter means; and wherein the bidirectional discharge means comprises a diode and a controllable switch connected in antiparallel between said free terminal of the auxiliary inductor and a terminal of the capacitor which is connected to the auxiliary switch of said first interface.

8. A static electric power converter according to claim 5, wherein the second interface includes:

an auxiliary inductor connected to the DC voltage source; and controllable switch means connected between said auxiliary inductor and said input of the converter means to enable a linear current charging of said auxiliary inductor subjected to a voltage kE immediately before interruption of said voltage window of amplitude (1+k)E and for initiating current discharge through the auxiliary inductor under an inverse input voltage on interruption of said window.

9. A static electric power converter according to claim 8, wherein the controllable bidirectional switch means comprises two triggerable switches, each capable of conveying current in one direction only, connected in antiparallel between said auxiliary inductor and said input of the converter means.

10. A static electric power converter according to claim 5, wherein the second interface includes, connected in series across said input of the converter means:

an auxiliary inductor;

a capacitor cooperating with the inductor to form an oscillating circuit;

controllable bidirectional switch means switching in a zero-voltage mode to allow the oscillating circuit to oscillate under forced conditions at a voltage (1+k)E immediately before interruption of said voltage window of amplitude (1+k)E and to interrupt oscillation of said oscillating circuit upon termination of said window; and said converter further comprising:

short circuit means for short circuiting the capacitor of the oscillating circuit to enable the auxiliary inductor to be charged when said voltage window begins.

11. A static electric power converter according to claim 10, wherein the controllable bidirectional switch means comprise a controllable switch and a diode connected in antiparallel, and the short circuit means comprises a diode connected in an opposed direction.

* * * * *

UNITED STATES PATENT AND TRADEMARK OFFICE
CERTIFICATE OF CORRECTION

PATENT NO. : 5,737,205
DATED : April 7, 1998
INVENTOR(S) : POULIQUEN, ET AL.

It is certified that error appears in the above-indentified patent and that said Letters Patent is hereby corrected as shown below:

Col. 4, Line 13, delete "4a'/aIs" and insert --(4a'/a)Is--;

Col. 5, Line 6, delete "$\psi$" and insert --$\phi$--;

Col. 6, Line 20, delete "$\psi$" and insert --$\phi$--;

Line 21, delete "$\psi$" and insert --$\phi$--;

Line 23, delete "$\psi$" and insert --$\phi$--;

Col. 11, Line 65, delete "2Is" and insert -- -2Is--.

Signed and Sealed this

Twenty-fifth Day of August, 1998

Attest:

BRUCE LEHMAN

*Attesting Officer*   *Commissioner of Patents and Trademarks*